(12) United States Patent
Muraki et al.

(10) Patent No.: US 8,027,128 B2
(45) Date of Patent: Sep. 27, 2011

(54) SUSPENSION AND DISK DRIVE

(75) Inventors: Takuma Muraki, Kanagawa (JP); Hiroyasu Tsuchida, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 339 days.

(21) Appl. No.: 12/386,755

(22) Filed: Apr. 21, 2009

(65) Prior Publication Data

US 2009/0268347 A1 Oct. 29, 2009

(30) Foreign Application Priority Data

Apr. 21, 2008 (JP) ................. 2008-109692

(51) Int. Cl.
*G11B 21/18* (2006.01)
(52) U.S. Cl. .................................... 360/245.3
(58) Field of Classification Search ............... 360/245.3
See application file for complete search history.

(56) References Cited

U.S. PATENT DOCUMENTS

| 5,602,699 | A | 2/1997 | Khan |
| 5,694,270 | A | 12/1997 | Sone et al. |
| 6,002,548 | A | 12/1999 | Ohwe et al. |
| 7,317,595 | B2 | 1/2008 | Tsuchida et al. |
| 2004/0027725 | A1 | 2/2004 | Pan et al. |
| 2004/0246625 | A1* | 12/2004 | Tsuchida et al. ........... 360/244.2 |
| 2007/0263323 | A1 | 11/2007 | Uematsu et al. |
| 2008/0144223 | A1* | 6/2008 | Muraki et al. ............. 360/244.8 |

FOREIGN PATENT DOCUMENTS

JP    2003-109338    4/2003

* cited by examiner

*Primary Examiner* — Amir Zarabian
*Assistant Examiner* — Jay Radke

(57) ABSTRACT

Embodiments of the present invention help to increase yaw stiffness while achieving higher peel stiffness and lower roll stiffness and pitch stiffness in a suspension supporting a head slider. A gimbal according to an aspect of the present invention has a securing point where the gimbal is secured to a load beam in the front and securing points where the gimbal is secured to the load beam in the rear. The gimbal tongue pivots on a dimple contact point. A front ring is secured at the securing point to support the gimbal tongue. The rear ring is secured at the securing points to support the gimbal tongue. The rear ring provides the gimbal tongue with higher yaw stiffness than the front ring. The front ring provides the gimbal tongue with higher peel stiffness than the rear ring.

20 Claims, 10 Drawing Sheets

SUSPENSION AND DISK DRIVE

CROSS-REFERENCE TO RELATED APPLICATION

The instant nonprovisional patent application claims priority to Japanese Patent Application No. 2008-109692 filed Apr. 21, 2008, and which is incorporated by reference in its entirety herein for all purposes.

BACKGROUND OF THE INVENTION

A hard disk drive (HDD) spins a magnetic disk of a recording medium at high speed and reads and writes data with a head slider flying and moving over the magnetic disk. An actuator supports a head slider and swings across the magnetic disk to move the head slider along the radial direction of the spinning magnetic disk.

Figure 9:
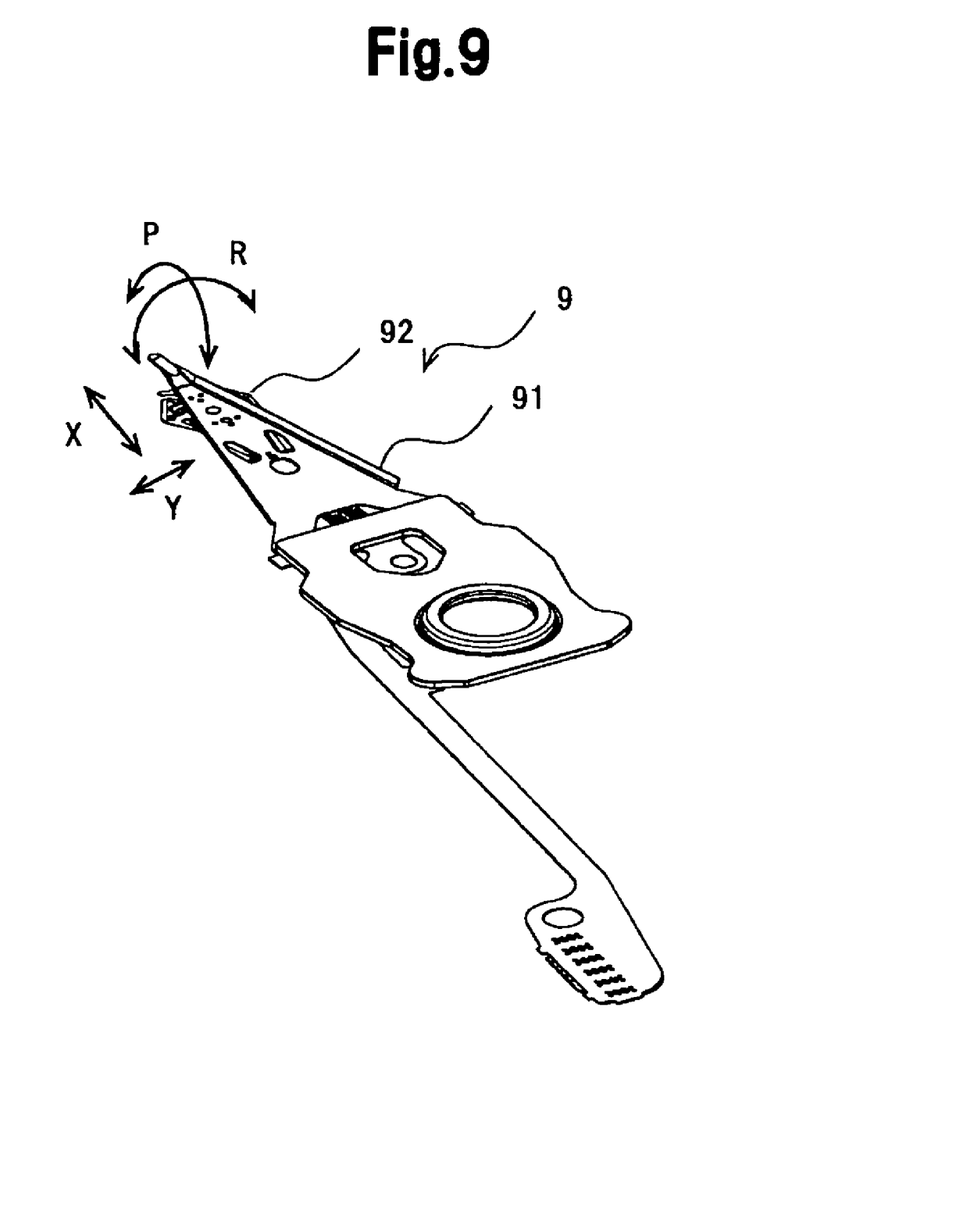
FIG. 9 is a perspective view schematically showing the structure of an HGA in a conventional art.

The actuator comprises a suspension secured at the tip of an arm and the suspension supports the head slider. As shown in FIG. 9, a typical suspension 9 comprises a plurality of members and comprises a load beam 91 and a gimbal 92 secured to the magnetic disk side of the load beam 91. The load beam 91 positions the head slider at a specific track in accordance with the operation of the actuator and generates a pressing force to press the head slider toward the magnetic disk. The head slider flies at a specific spacing from the magnetic disk surface under the balance between the pressing force of the load beam and the lift force from the air bearing which is caused by the viscous airflow between the air bearing surface (ABS) and the magnetic disk surface.

Figure 10:
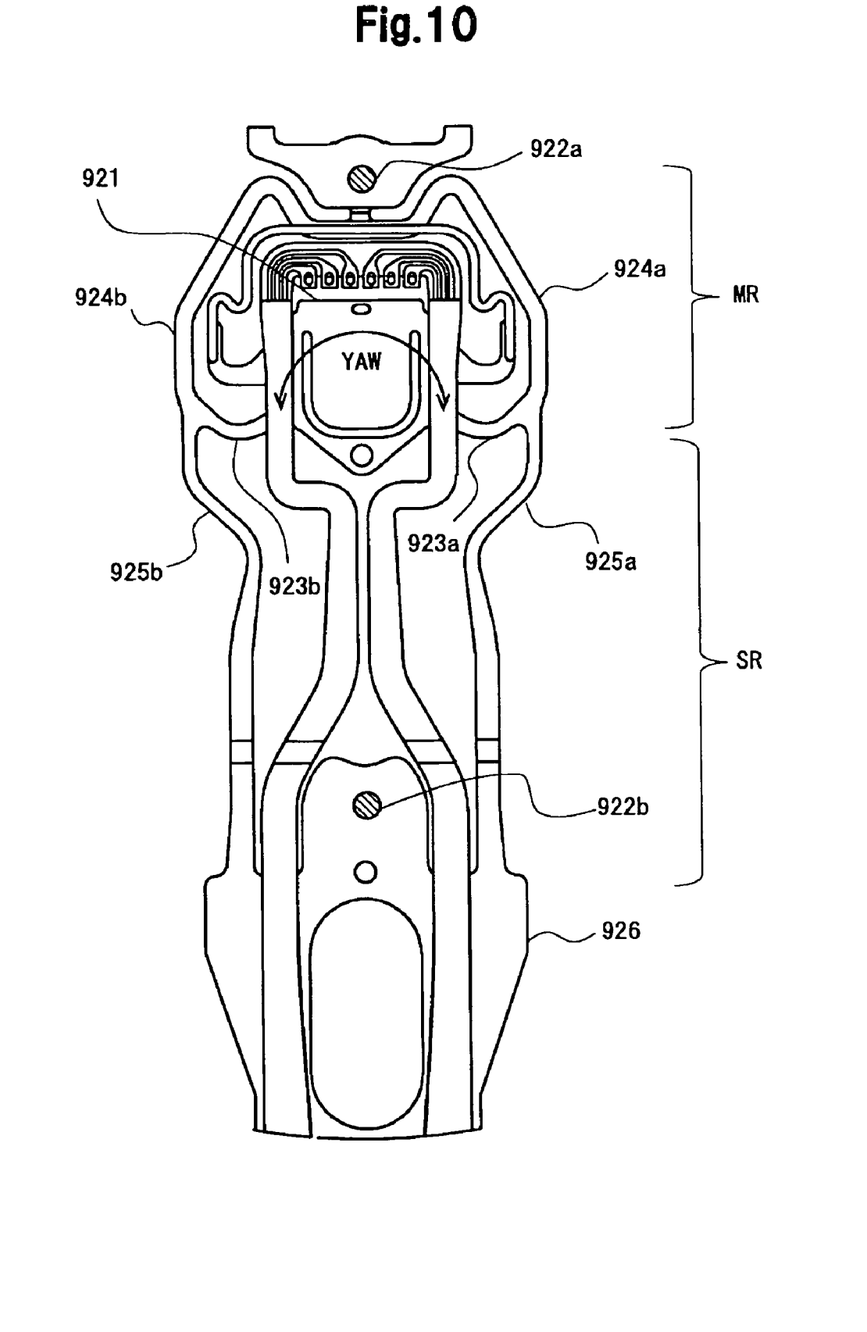
FIG. 10 is a plan view schematically showing the structure of an HGA in a conventional art.

The gimbal 92 is generally made of a thin stainless steel and comprises a gimbal tongue (921 in FIG. 10). The head slider is secured to the gimbal tongue. The back side of the gimbal tongue contacts a projected dimple of the load beam 91, and the gimbal tongue and the head slider thereon pivot on the contact point with the dimple. The pivoting motion is known as the pitch and roll motion or the gimbal motion. This movement keeps the spacing and the attitude of the head slider to the magnetic disk surface.

The roll motion is a motion in the direction denoted by R in FIG. 9; specifically a pivot movement on the X-axis which is the longitudinal direction of the suspension 9. The pitch motion is a motion in the direction denoted by P in FIG. 9; specifically a pivot movement on the Y-axis which is perpendicular to the X-axis and included in a surface parallel to the disk surface. The characteristics of the pitch motion and the roll motion are determined by the structure of the entire suspension. Lower pitch stiffness and roll stiffness of the gimbal tongue achieve better track following performance and better flight attitude control.

While a head slider is flying above a track and performing a following motion, the gimbal needs to support the head slider flexibly so that the head slider can maintain the following motion responsive to changes in shapes of the magnetic disk surface. Therefore, it is important to reduce the pitch stiffness and roll stiffness of the gimbal tongue. On the other hand, an HDD is required to have more shock resistance. An HDD with the ramp loading and unloading scheme lifts up the head slider from above the disk surface in unloading and lifts it down to above the disk surface in loading.

To improve the shock resistance of the device and to achieve stable operation where the head slider does not contact the magnetic disk in loading/unloading, it is necessary to take peel stiffness into account in addition to the pitch stiffness and the roll stiffness. The peel stiffness is a vertical stiffness when applying a force to the gimbal tongue normal to the disk surface, which is desirably higher for the shock resistance or loading/unloading operation.

The gimbal 92 functions as a spring mechanism for supporting the slider on the securing point to the load beam as a support point. In a typical structure of a gimbal, if the peel stiffness increases, the pitch stiffness and the roll stiffness increase together, so that a gimbal with higher peel stiffness and smaller pitch and roll stiffnesses cannot be accomplished no matter how parameters for the stiffnesses are adjusted.

In this regard, gimbals having the spring structure with lower pitch and roll stiffnesses and higher peel stiffness have been proposed (for example, refer to Japanese Patent Publication No. 2004-326891 "Patent Document 1"). FIG. 10 is a plan view showing a part of such a gimbal. The gimbal 92 is secured to a load beam at two securing points 922a and 922b sandwiching a gimbal tongue 921 between at the front and at the rear. The securing points 922a and 922b are typically welded by beam welding. Hereinafter, the direction viewing a head slider from the swing shaft of the actuator is defined as frontward and the direction viewing the swing shaft from the head slider is defined as rearward.

In the gimbal 92 of FIG. 10, support arms 923a and 923b protrude from the middle of the side edges of the gimbal tongue 921. The support arms 923a and 923b are connected to the extending frontward main arms 924a and 924b, respectively. The two main arms 924a and 924b join together in the front and the main arms 924a, 924b and the support arms 923a, 923b are continuous. The main arms 924a, 924b and the support arms 923a, 923b form a ring shaped spring structure for supporting the gimbal tongue 921. The main arms 924a and 924b form a path like a big ring swelling vertically to the center line of the gimbal 92.

Moreover, the support arms 923a and 923b are connected to extending rearward sub arms 925a and 925b, respectively. The sub arms 925a and 925b join to a support body 926 in the rear. The sub arms 925a, 925b, the support arms 923a, 923b, and a part of the support body 926 are continuous to form a ring-shaped spring structure for supporting the gimbal tongue 921. The sub arms 925a and 925b extend from the rear toward the front substantially in parallel to the center line of the gimbal 92, then swell, and join to the main arms 924a, 924b and the support arms 923a, 923b.

In the gimbal, the stiffness of the front ring-shaped spring structure (a main ring MR) including the main arms 924a and 924b is higher than the one of the rear ring-shaped spring structure (a sub ring SR) including the sub arms 925a and 925b, and the main ring MR functions dominantly in supporting the gimbal tongue 921. The pitch stiffness and the roll stiffness of the gimbal tongue 921 (head slider) depend on the shape of the main ring and the sub ring SR contribute to them little.

Specifying parameters of the dominant main ring MR leads to determining the values of the stiffnesses of the gimbal tongue 921, substantially ignoring the sub ring SR's contribution to the stiffnesses. Specifically, reduction of the distance between the gimbal tongue and the securing points achieves higher peel stiffness. Besides, adjustment of values such as the path length, the path shape, and the widths of the main ring achieves smaller pitch and roll stiffnesses, maintaining the higher peel stiffness.

The sub ring (sub arms) affects the stiffnesses a little and it is not the element to determine the values of the above three stiffnesses. The sub arms 925a and 925b are needed in producing a suspension. The sub arms 925a and 925b maintain the entire gimbal in a stable shape in assembling the gimbal and the load beam to improve workability.

The suspension disclosed in the Patent Document 1 achieves lower roll and pitch stiffnesses and higher peel stiffnesses concurrently. This is because, as described above, the sub ring supports the gimbal tongue in an auxiliary manner, and the main ring can dominantly provide the gimbal tongue with stiffness.

The gimbal design in the Patent Document 1, however, considers the pitch, roll, and peel stiffnesses of the gimbal tongue, but does not yaw stiffness. The yaw stiffness is the stiffness to a yaw motion of the gimbal tongue (head slider). The yaw motion is a pivoting motion in the direction denoted by YAW in FIG. 10. Specifically, it is a pivoting motion on the normal to the head slider mount surface (main surface) of the gimbal tongue and is a pivoting motion within the ABS.

Data track pitch significantly decreases with increase in storage capacity of an HDD. Accordingly, a head slider's slight yaw motion causes a head element portion to shift radially from a target position to raise a read/write error. Especially, it has been found that, if the roll stiffness and the pitch stiffness are reduced without considering the yaw stiffness as in the Patent Document 1, the yaw stiffness decreases together to cause oscillation in a yaw mode at low frequency easily.

Increases in the roll stiffness and the pitch stiffness can increase the yaw stiffness, which reduces the following performance of the head slider responsive to change in shape of the magnetic disk surface, however. Accordingly, a suspension is desired that has higher yaw stiffness while keeping higher peel stiffness and lower roll and pitch stiffnesses.

BRIEF SUMMARY OF THE INVENTION

Embodiments of the present invention help to increase yaw stiffness while achieving higher peel stiffness and lower roll stiffness and pitch stiffness in a suspension supporting a head slider. According to the embodiment of FIG. 5, a gimbal has a securing point 432$a$ where the gimbal is secured to a load beam in the front and securing points 432$b$ and 432$c$ where the gimbal is secured to the load beam in the rear. The gimbal tongue 431 pivots on a dimple contact point 311. A front ring FR is secured at the securing point 432$a$ to support the gimbal tongue. The rear ring RR is secured at the securing points 432$b$ and 432$c$ to support the gimbal tongue. The rear ring RR provides the gimbal tongue with higher yaw stiffness than the front ring FR. The front ring FR provides the gimbal tongue with higher peel stiffness than the rear ring RR.

BRIEF DESCRIPTION OF THE DRAWINGS

FIGS. 2($a$) and 2($b$) are plan views schematically depicting a head gimbal assembly according to one embodiment.

FIGS. 3($a$)-3($f$) are plan views schematically depicting the structure of the head gimbal assembly according to one embodiment.

DETAILED DESCRIPTION OF THE INVENTION

Embodiments of the present invention relate to a suspension for supporting a head slider and a disk drive, more particularly, relate to a technique to improve the stiffness of a gimbal to which a head slider is secured.

An aspect of embodiments of the present invention is a suspension comprising a load beam and a gimbal secured to the load beam for supporting a head slider. The gimbal comprises a first support area including a first securing point where the gimbal is secured to the load beam in the front, a second support area including a second securing point where the gimbal is secured to the load beam in the rear, a gimbal tongue having a mount surface on which the head slider is mounted for performing pivoting motion on a dimple contact point, a front ring which is a ring-shaped spring structure joining the first support area for supporting the gimbal tongue and providing the gimbal tongue with peel stiffness, and a rear ring which is a ring-shaped spring structure joining the second support area for supporting the gimbal tongue and providing the gimbal tongue with higher yaw stiffness than the front ring and lower peel stiffness than the front ring. This gimbal structure achieves an appropriate stiffness for the gimbal tongue.

The distance between the first securing point and the dimple contact point may be smaller than the distance between the second securing point and the dimple contact point. This effectively increases the peel stiffness provided by the front ring while suppressing the effects on the other stiffnesses.

The rear ring may comprise a pair of ribbon-like rear arms extending frontward from the second support area, and each of the pair of rear arms include the smallest width part in the rear arm and a straight-line part including the smallest width part in the rear arm and extending from the front end to the rear end of the rear arm while keeping the smallest width. This effectively increases the yaw stiffness provided by the rear ring while suppressing the effects on the other stiffnesses.

Moreover, the width of each of the pair of rear arms may increase in the direction from the front end toward the rear end. This increases the yaw stiffness provided by the rear ring. In this regard, the width of each of the pair of rear arms is not necessary to gradually increase in the direction from the front end toward the rear end. For example, the width may be uniform in a certain area. However, the width never decreases in the direction from the front end toward the rear end.

The distance between the pair of rear arms may gradually decrease in the direction from the front end toward the rear end. This increases the yaw stiffness provided by the rear ring while suppressing the effects on the other stiffnesses.

The second support area may include two securing points which are located closest to the dimple contact point in the rear. This increases the yaw stiffness provided by the rear ring. Moreover, the connection part between each of the pair of rear arms and the second support area may be located between the two securing points in the arrangement direction of the pair of rear arms. This effectively increases the yaw stiffness provided by the rear ring while suppressing the effects on the other stiffnesses.

The rear ring may further comprise a pair of support arms each connecting a side edge of the gimbal tongue and each of the front ends of the pair of rear arms. Moreover, the center of the support arm at each of the side edges of the gimbal tongue may be located in front of the dimple contact point. These increase the yaw stiffness provided by the rear ring.

The front ring may include a pair of front arms and a pair of support arms; each of the pair of support arms connects the gimbal tongue and each of the pair of rear arms; and each of the pair of front arms is connected to each of the pair of rear arms at the rear of the connection part to the pair of support arms. This suppresses increase in the pitch stiffness and the roll stiffness provided by the front ring.

Moreover, the width of each of the pair of rear arms may gradually increase from a specific position at the rear of the connection part to the front arm toward the second supporting area. This increases the yaw stiffness provided by the rear ring.

A disk drive according to another aspect of embodiments of the present invention comprises a disk, a head slider for accessing the disk, and an actuator having a suspension for supporting the head slider for moving the head slider above the disk by swinging on a swing shaft; the suspension is a suspension having any one of the structures described above. This suspension structure achieves an appropriate stiffness of the gimbal tongue.

According to embodiments of the present invention, yaw stiffness can be increased while higher peel stiffness and lower roll and pitch stiffnesses are achieved in a suspension for supporting a head slider.

Hereinafter, particular embodiments of the present invention will be described. For clarity of explanation, the following description and the accompanying drawings contain omissions and simplifications as appropriate. Throughout the drawings, like components are denoted by like reference numerals, and their repetitive description is omitted if not necessary for the sake of clarity. In the embodiments, a hard disk drive (HDD) will be described as an example of a disk drive. The embodiments have a feature in the structure of a suspension to be mounted in an HDD.

Figure 1:
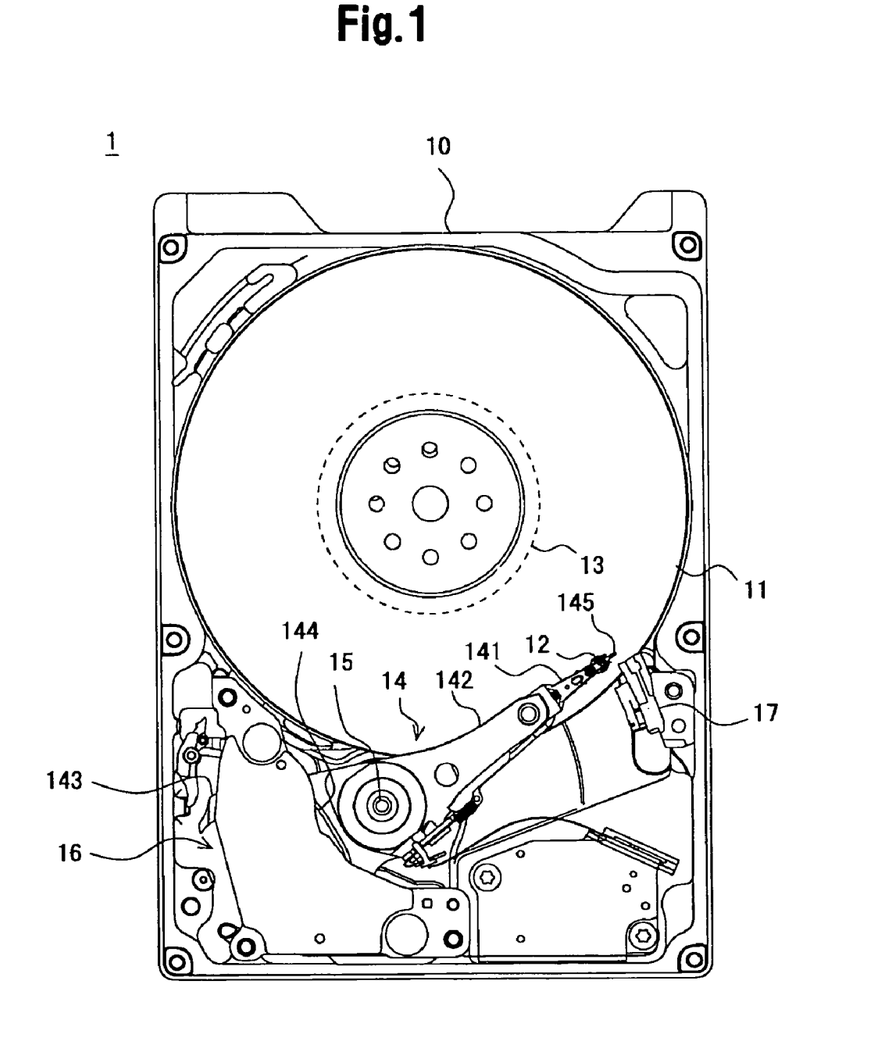
FIG. 1 is a plan view schematically depicting the configuration of an HDD according to one embodiment.

FIG. 1 depicts the entire configuration of an HDD 1 on which the suspension of one embodiment is mounted. A base 10 is secured with a top cover (not shown) for covering its top opening to form an enclosure and houses components of the HDD 1 therein. A spindle motor 13 spins a magnetic disk 11 at a specific angular rate. The magnetic disk 11 is an example of a disk for storing data has a magnetic layer for storing data in its recording surface. A head slider 12 for accessing (reading or writing) the disk comprises a slider and a head element portion fixed to the slider's surface. The head element portion has a recording element and/or a reproducing element. One or more magnetic disks are mounted on the HDD 1.

An actuator 14 is swingably held by a swing shaft 15 and driven by a voice coil motor (VCM) 16. The actuator 14 holds the head slider 12 and swings on the swing shaft 15 to move the head slider 12. The actuator 14 comprises a suspension 141, an arm 142 for supporting the suspension 141 and having an opening for the swing shaft 15 to fit in, a coil support 143, and a flat coil 144 on the inner circumferential side of the coil support 143 in this order from the tip where the head slider 12 is placed. Suspensions 141 are provided each corresponding to each recording surface of the magnetic disk 11.

As exemplified in FIG. 1, the actuator 14 moves a head slider 12 above the data area of a spinning magnetic disk 11 to access the magnetic disk 11. The actuator 14 swings to move the head slider 12 along the radial direction of the surface of the magnetic disk 11. The head slider 12 flies over the spinning magnetic disk 11. Typically, the magnetic disk 11 spins counterclockwise in FIG. 1.

A ramp 17 is provided on the outer periphery of the magnetic disk 11 aside of the magnetic disk 11. While the HDD 1 is not accessing data, such as in non-operating or idling, the actuator 14 stays at a stand-by position on the ramp 17. In unloading the head slider 12, the actuator 14 rotates from above the data area of the magnetic disk 11 toward the ramp 17 (clockwise in FIG. 1), a tab 145 at the tip of the actuator 14 slides and moves across the ramp 17, and the actuator 14 stops at the stand-by position. At this time, the head slider 12 is positioned away from the magnetic disk 11. In loading, the actuator 14 swings in the direction reverse to the one in unloading to move the head slider 12 to above the data area of the magnetic disk 11.

Figure 2:
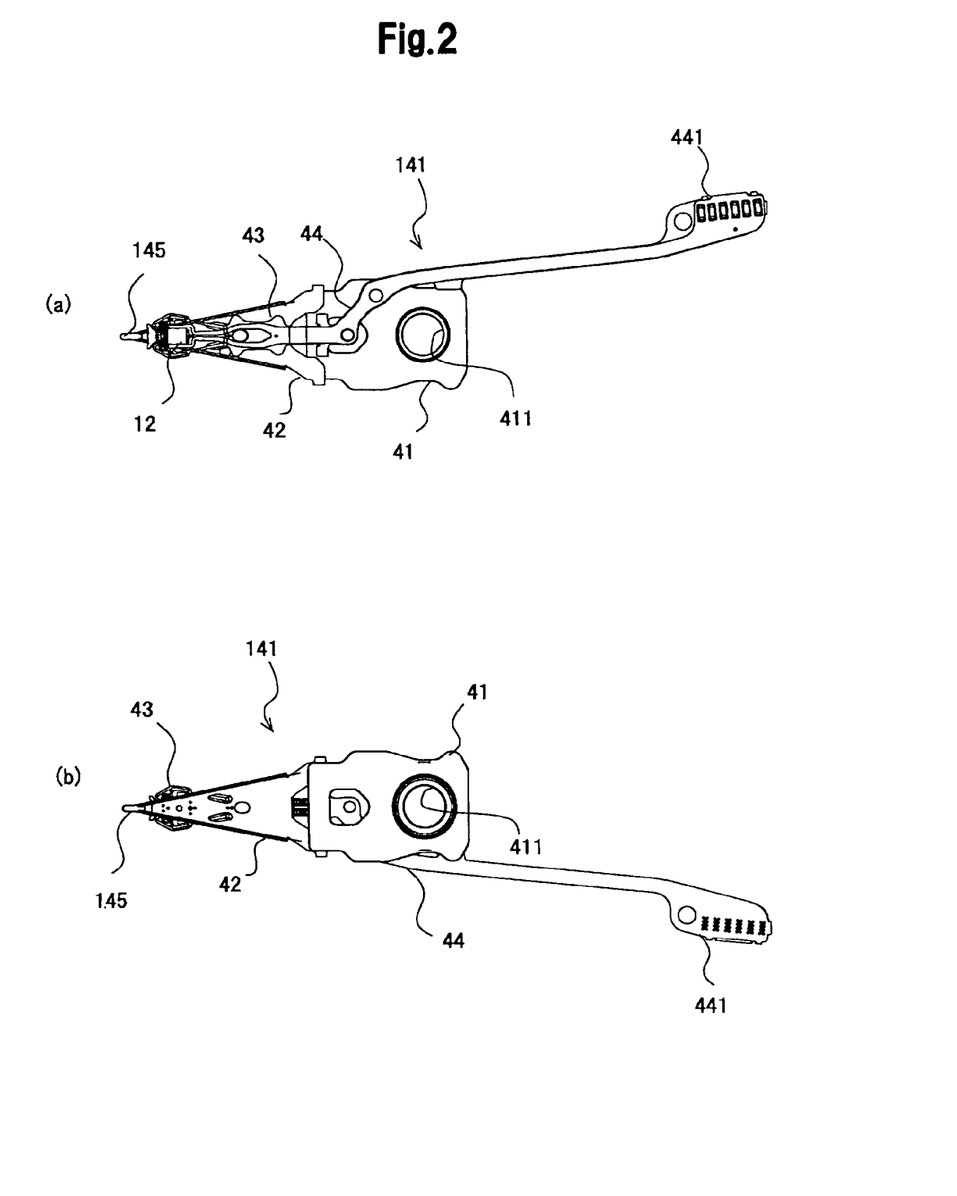

FIGS. 2(a) and 2(b) are plan views showing the outline of a head gimbal assembly (HGA), which is an assembly of the suspension 141 of the present embodiment and a head slider 12. FIG. 2(a) is a drawing of an HGA viewed from the magnetic disk side and FIG. 2(b) is a drawing of the HGA viewed from the opposite side. The suspension 141 comprises a mount plate 41, a load beam 42, and a gimbal 43. On the gimbal 43, a transmission line 44 is formed and the head slider 12 is secured on the gimbal 43.

In an opening 411 of the mount plate 41, the suspension 141 is secured to the arm 142. In the present specification, the side where the tab 145 is formed is called the tip side or the front side of the suspension 141. In contrast of the front side, an arm side or an actuator swing shaft side of the suspension 141 is the rear side. Thus, the direction connecting the actuator swing shaft 15 and the head slider 12 is the front-rear direction and the direction parallel to the magnetic disk recording surface and perpendicular to the front-rear direction is the left-right direction.

The load beam 42 is made of stainless steel, for example, and functions as a thin precision plate spring. The load beam 42 extends lengthwise vertically to the swing direction in its shape, is thin and light, and has necessary stiffness. The spring property of the load beam 42 generates a load counterbalancing the lift force of the head slider 12. This load balances the pressure (lift force) caused by the air viscosity between the air bearing surface (ABS) of the head slider 12 and the spinning magnetic disk 11 so that the head slider 12 flies at a desired height. At the tip of the load beam 42, a tab 145 is provided.

The gimbal 43 is welded to the magnetic disk side of the load beam 42 by spot welding. The welding may utilize heat by laser or Joule heat by electric current. The gimbal 43 is made of stainless steel, for example. The gimbal 43 has a desired elasticity and is formed deformable. At the front of the gimbal 43, a tongue-like gimbal tongue 431 (refer to FIG. 4) is formed. The head slider 12 is secured to the gimbal tongue 431. The structure of the gimbal 43 will be described in detail later.

The transmission line 44 formed on the gimbal 43 transmits signals of elements on the head slider 12. One end of the transmission line 44 is a multiconnector 441 having connection terminals of leads. The multiconnector 441 is connected to a preamplifier IC. The other end of the transmission line 44 is connected to connection pads of the head slider 12.

Figure 3:
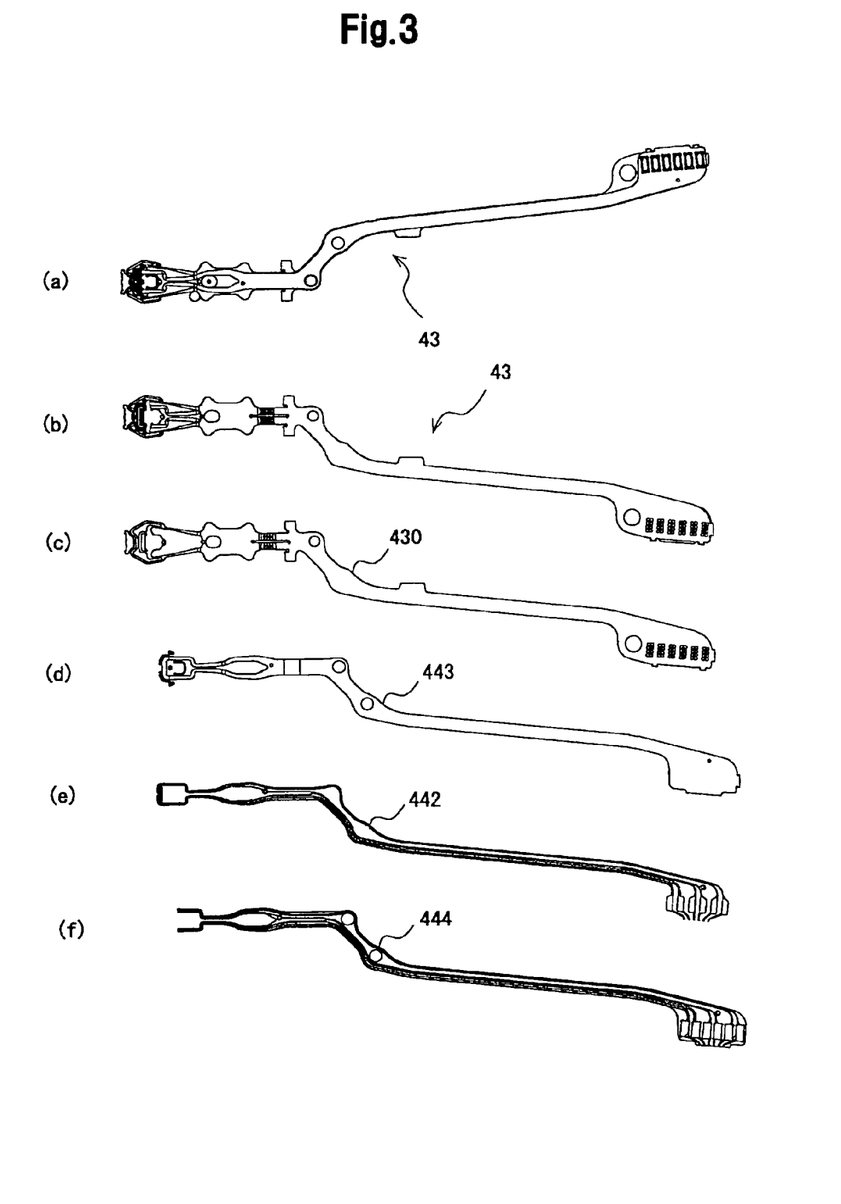

FIGS. 3(a) to 3(f) are drawings depicting the structure of the gimbal 43. The gimbal 43 is formed as a laminated structure through micro processing technology such as the photolithographic etching process and the deposition process. FIGS. 3(a) and 3(b) show a gimbal 43 formed by laminating a plurality of layers, and FIGS. 3(c) to 3(f) show the structures of layers constituting the gimbal. FIG. 3(a) is a drawing of the gimbal 43 viewed from the magnetic disk side and FIG. 3(b) is a drawing viewed from the opposite side.

FIGS. 3(c) to 3(f) show components in the order of being laminated toward the disk surface. FIG. 3(c) shows a metal layer 430, which is typically made of a thin plate of stainless steel. The metal layer 430 may be shaped by stamping and etching into a desired shape. The material of the metal layer 430 is not limited to stainless steel, but other rigid spring materials such as beryllium, copper, or titanium may be selected.

The metal layer 430 forms the spring structure of the gimbal 43 and typically has a uniform thickness. The thickness of the metal layer 430 is one of the parameters to determine the stiffness provided by the spring structure and may be partially changed to determine the parameter. Besides, the material is one of the parameters and may be partially changed into different materials.

FIG. 3(d) shows a dielectric layer 443 made of polyimide to insulate the metal layer 430 from the copper layer 442 constituting a part of the transmission line 44 (refer to FIG. 3(e)). The dielectric layer 443 is laminated on the metal layer 430 along the path of the copper layer 442 which is patterned on the dielectric layer 443. The copper layer 442 transmits the head slider's signals and is insulated from the metal layer 430 by the dielectric layer 443.

FIG. 3(e) shows a copper layer 442 which is a line pattern for a head on a slider. FIG. 3(f) shows a cover layer 444, which is a polyimide layer deposited to protect the surface of the copper layer 442. The dielectric layer 443, the copper layer 442, and the cover layer 444 integrally constitute the transmission line 44.

Figure 4:
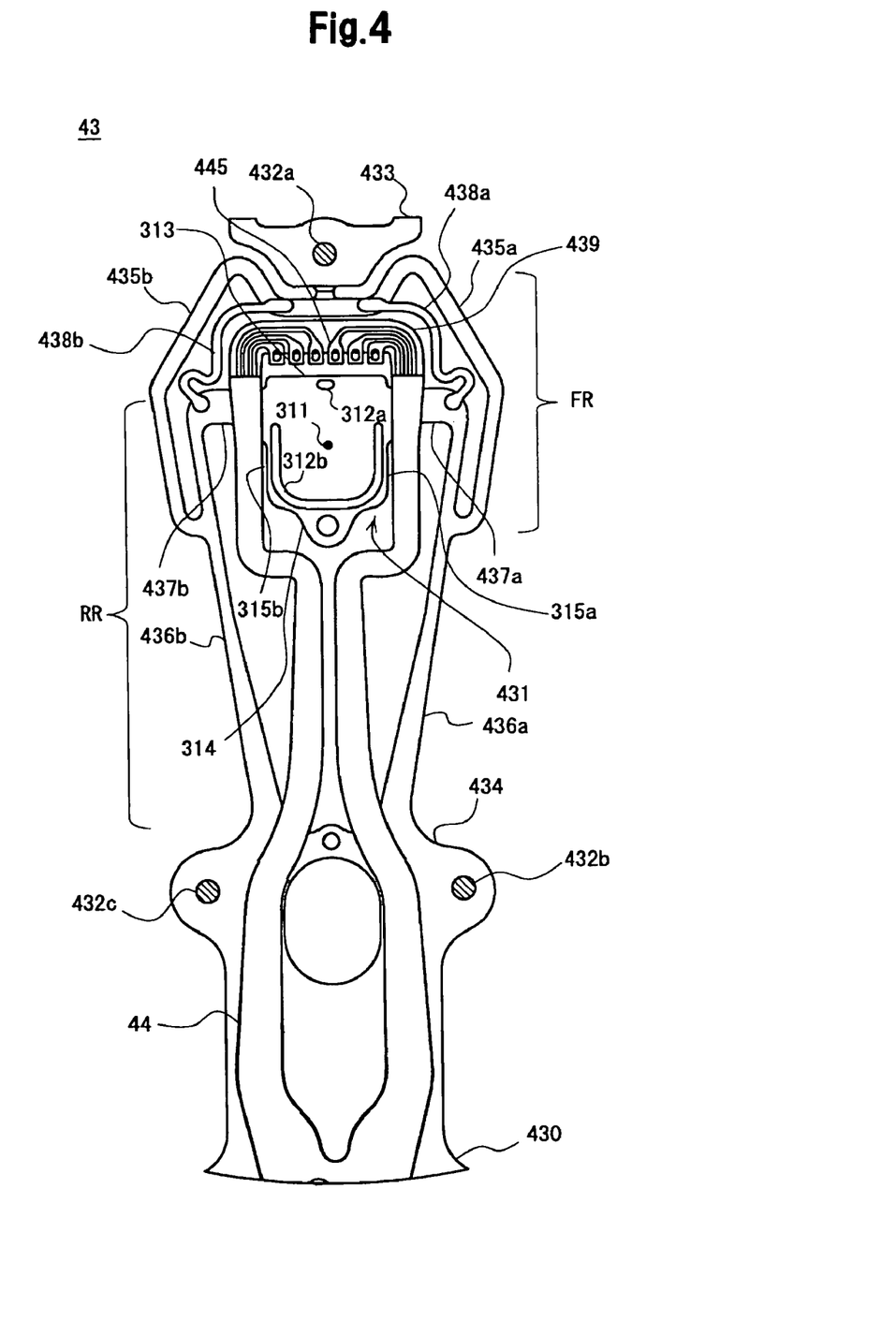
FIG. 4 is an enlarged plan view of the tip of the gimbal according to one embodiment, viewed from a magnetic disk side.

FIG. 4 is an enlarged plan view of the tip of the gimbal 43 shown in FIG. 3(a), viewed from the magnetic disk side. On the metal layer 430 of the gimbal 43, a transmission line 44 is arranged. In the part shown in FIG. 4, the metal layer 430 is secured to the load beam 42 (not shown in FIG. 4) at securing points 432a to 432c by welding. In the present example, the shape of the gimbal 43 is left-right symmetric in the area in front of the securing points 432b and 432c.

Specifically, the securing point 432a is located in the support plate 433 at the tip, which is a front support area. The two securing points 432b and 432c are located in a part of the support body 434, which is a rear support area. In FIG. 4, the rear support area includes two securing points 432b and 432c, which are at the fore front of the area at the rear of the gimbal tongue 431, and does not include other securing points at the rear of these points.

In the area shown in FIG. 4, the gimbal 43 is secured to the load beam 42 at these securing points. Between the securing point 432a and the securing points 432b, 432c, there is no other securing point to the load beam 42. Namely, the securing point 432a is the securing point closest to the gimbal tongue 431 in the front area in the front-rear direction.

The securing points 432b and 432c are the securing points closest to the gimbal tongue 431 in the rear area in the front-rear direction. In the example of FIG. 4, the positions of the securing points 432b and 432c are symmetric on the center line of the gimbal 43. The gimbal 43 can perform a gimbal motion within the range defined by these securing points without being restrained by the load beam 42. The support body 434 is secured to the load beam 42 at the other welded points (securing points) at the rear of the securing points 432b and 432c (the actuator swing shaft side).

Between the securing point 432a and the securing points 432b, 432c, a gimbal tongue 431 is located at a position closer to the securing point 432a on the tip side. The head slider 12 is bonded to the middle of the gimbal tongue 431. At about the center of the gimbal tongue 431 in the left-right direction, a contact point 311 with a projected dimple of the load beam is provided. In the example of FIG. 4, the securing point 432a and the dimple contact point 311 are on the center line of the gimbal 43. The distances from the securing point 432b to the dimple contact point 311 and from the securing point 432c to the dimple contact point 311 are the same.

Figure 5:
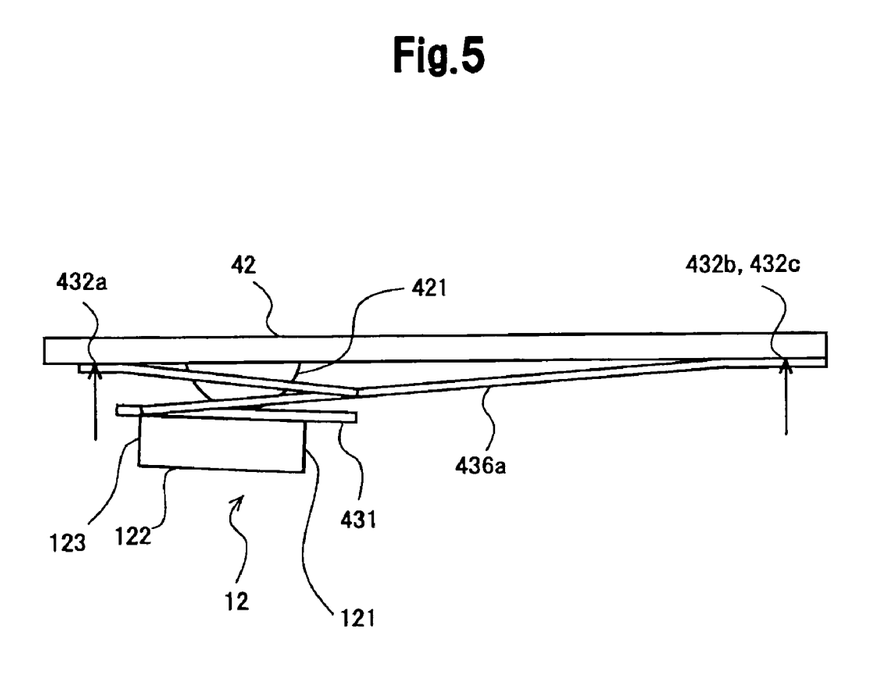
FIG. 5 is a side view schematically depicting a part of the head gimbal assembly according to one embodiment.

FIG. 5 is a side view schematically showing a part of an HGA. On the gimbal tongue 431 of a gimbal 43, a head slider 12 is bonded so as to fit in just about the middle of the gimbal tongue. A projected dimple 421 is formed on the load beam 42 so as to contact the back surface of the slider mounting surface of the gimbal tongue 431 at the position which the perpendicular line though the approximate center mass of the head slider 12 passes through. It provides the gimbal tongue 431 with a pivot of the pivoting motion of the head slider 12. The dimple may be formed on the gimbal. In this case, the pivot of the pivoting motion is the contact point between the dimple and the load beam.

Returning to FIG. 4, on the head slider mounting surface of the gimbal tongue 431, spacers 312a and 312b are provided. Typically, the spacers 312a and 312b are made of polyimide resin and the head slider 12 is secured contacting the spacers 312a and 312b. The spacers 312a and 312b allow the head slider 12 to be bonded in a desired attitude onto the gimbal tongue 431.

The gimbal tongue 431 is supported by the two ring-shaped spring structures in front of and at the rear of it. The front ring-shaped spring structure is a front ring FR consisting of front arms 435a and 435b, a part of rear arms 436a and 436b, and support arms 437a and 437b. The rear ring-shaped spring structure is a rear ring RR consisting of the rear arms 436a and 436b, the support arms 437a and 437b, and a part of the support body 434.

All of the parts constituting the front ring FR and the rear ring RR are a part of the metal layer 430. Moreover, each of the front ring FR and the rear ring RR is a continuous integral part in the metal layer 430 of the gimbal 43. The front ring FR is located in front of the gimbal tongue 431 and supports it, and the rear ring RR is located at the rear of the gimbal tongue 431 and supports it.

The rear arms 436a and 436b extend frontward from the proximities of the securing points 432b and 432c on the support body 434. The support arms 437a and 437b connect the rear arms 436a and 436b to the gimbal tongue 431, respectively. The front arms 435a and 435b are connected to the rear arms 436a and 436b, respectively. The front arms 435a and 435b extend frontward from the rear arms 436a and 436b, then bend leftward and rightward, respectively, and join together.

Limiter bridges 438a and 438b link the front arm 435a and the support arm 437a, and the front arm 435b and the support arm 437b, respectively. Typically, the limiter bridges 438a and 438b are made of polyimide resin and prevent elastic deformation of the gimbal 43. Depending on the design of the suspension 141, the limiter bridges 438a and 438b may be omitted.

Hereinafter, the front edge 313 of the gimbal tongue 431 is called a trailing edge; and the rear edge 314, a leading edge. The edges 315a and 315b on the right and the left are called side edges. Each of these corresponds to the designation of each edge of the head slider 12. As shown in FIG. 5, airflow flows in from the leading edge 121 of the head slider 12 to between the ABS 122 and the disk surface, and flows out from the trailing edge 123.

Returning to FIG. 4, the transmission line 44 extends from the support body 434 to the trailing edge of the gimbal tongue 431 along the center line of the gimbal 43. The transmission line 44 is laminated on the metal layer 430 in the area of the support body 434, which is a part of the metal layer, and extends in the air to the support arms 437a and 437b after separating from the support body 434.

On the trailing edge side of the gimbal tongue 431, a plate 439 is formed to provide an area for positioning and bonding for connecting the lead lines of the transmission line 44 to connection pads provided on the trailing edge surface of the head slider 12. From the plate 439, connection terminals 445 protrude to be physically and electrically connected to the connection pads of the head slider 12. In FIG. 4, six terminals 445 are exemplified.

Figure 6:
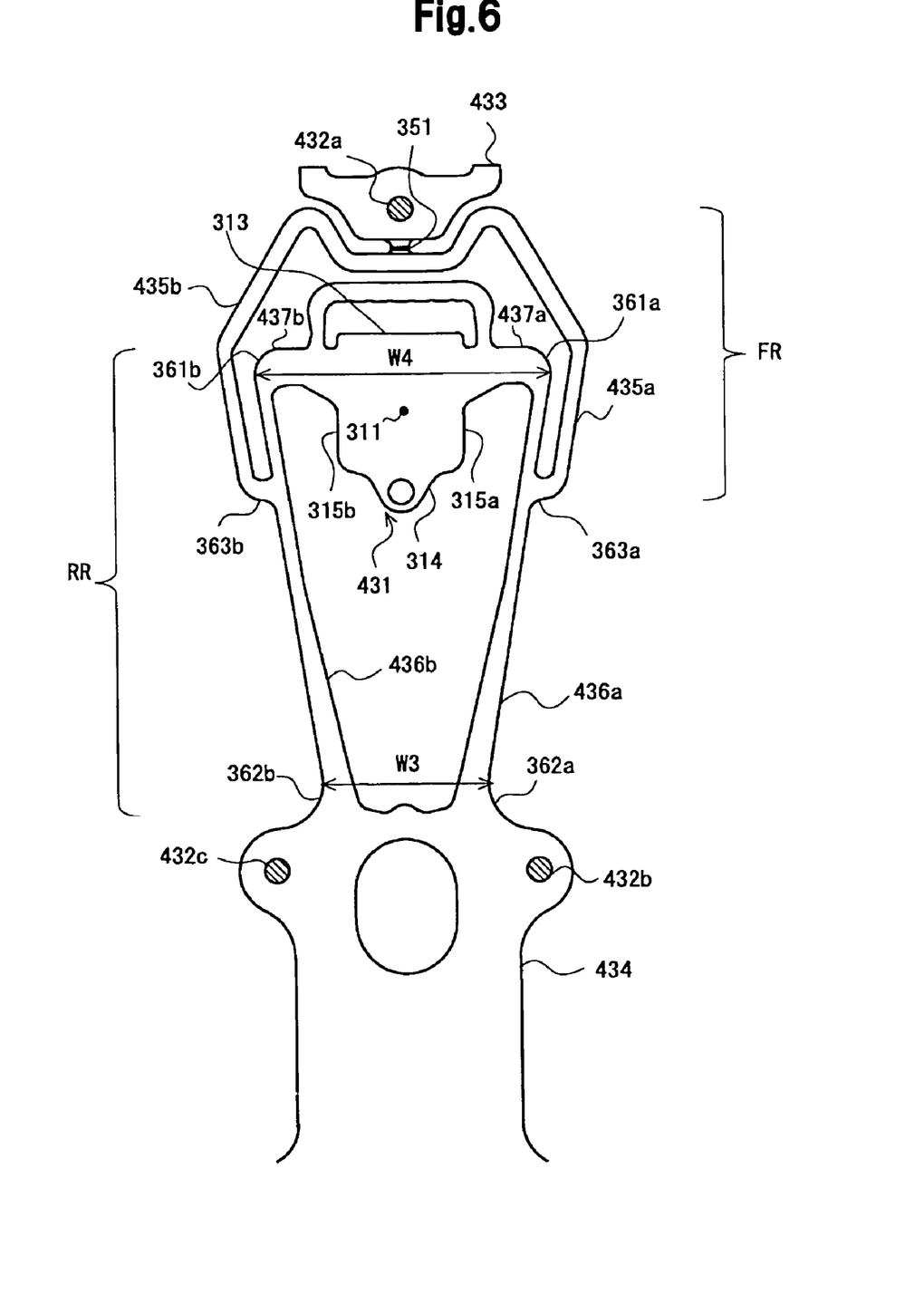
FIG. 6 is an enlarged plan view of the tip of the metal layer of the gimbal according to one embodiment.

Hereinafter, the structure of the metal layer 430 of the gimbal 43 will be described in more detail. FIG. 6 depicts the structure of the gimbal 43 shown in FIG. 4 with the transmission line 44, limiter bridges 438a, 438b, and spacers 312a, 312b removed. As described above, the gimbal tongue 431 is supported by two ring-shaped springs at the front and the rear, namely the front ring FR and the rear ring RR.

The front ring FR mainly composed of the front arms 435a and 435b supports the gimbal tongue 431 in the rear of it. Moreover, the front ring FR is connected to the support plate 433 including the securing point 432a via a connecting part 351 and secured at the securing point 432a in the front of the front ring FR. The connecting part 351 is provided at the part where the front arms 435a and 435b join together, on the center line of the gimbal 43, and between the securing point 432a and the dimple contact point 311.

In contrast, the rear ring RR mainly composed of rear arms 436a and 436b supports the gimbal tongue 431 in the front of the rear ring RR. Moreover, the rear ring RR is connected to the securing points 432b and 432c via a part of the support body 434 and secured at the securing points 432b and 432c in the rear of the rear ring RR.

As to stiffness property of the gimbal tongue 431, lower roll stiffness and pitch stiffness are desired for better flight attitude control of the head slider 12. On the other hand, generally for better loading/unloading operation, higher peel stiffness is desired; and moreover, higher yaw stiffness is desired for highly precise head positioning.

In the gimbal 43 of the present embodiment, the values of these stiffnesses in the gimbal tongue 431 are determined by the front ring FR and the rear ring RR. In the present embodiment, the front ring FR principally determines the peel stiffness of the gimbal tongue 431. In contrast, the rear ring RR principally determines the yaw stiffness of the gimbal tongue 431. As described above, the peel stiffness and the yaw stiffness of the gimbal tongue 431 may be higher. The design of the suspension of the present embodiment designs the gimbal 43 so that the front ring FR provides higher peel stiffness and the rear ring RR provides higher yaw stiffness.

On the other hand, the roll stiffness and the pitch stiffness of the gimbal tongue 431 may be as small as possible. Accordingly, the design of the suspension of the present embodiment designs the gimbal 43 so that the front ring FR and the rear ring RR provide the gimbal tongue 431 with lower roll stiffness and pitch stiffness.

In this way, the front ring FR provides the gimbal tongue 431 with higher peel stiffness than the rear ring RR and the rear ring RR provides the gimbal tongue 431 with higher yaw stiffness than the front ring FR. The gimbal tongue 431 supported by the two rings which increase the values of the different stiffnesses of the gimbal tongue concurrently achieves smaller pitch and roll stiffnesses and higher peel and yaw stiffnesses which are required for the gimbal tongue 431.

The effect on the pitch stiffness and the roll stiffness from the rear ring RR should may be smaller than that from the front ring FR. Moreover, the gimbal 43 may be designed so that the front ring FR will dominantly provide the gimbal tongue 431 with the roll stiffness and the pitch stiffness and the effect from the rear ring RR will be as small as possible. Since it is hardly necessary to consider the effect from the rear ring RR in designing the front ring FR, effective balancing between the higher peel stiffness and the lower pitch and roll stiffnesses can be achieved.

The roll stiffness and the pitch stiffness are determined by the parameters of the ribbon-like parts constituting the ring, such as the front arms 435a, 435b and the rear arms 436a, 436b. These parameters include the length, the shape, the width, and the material of the path. The roll and pitch stiffnesses can be adjusted by changing these parameters. Since the material of the metal layer 430 is the same and the thickness of the metal layer 430 is uniform in the present embodiment, the design of the suspension of the present embodiment sets the other parameters to appropriate values to achieve desired values for the roll stiffness and the pitch stiffness. Changes in the values of these parameters affect the peel stiffness, but the degree of the effect is not so large.

To reduce the contribution of the rear ring RR to the roll stiffness and the pitch stiffness, it is important to increase the respective distances between the front ends 361a, 361b and the rear ends 362a, 362b of the rear arms 436a, 436b. The rear arms 436a and 436b join the support arms 437a and 437b at the front ends 361a and 361b, respectively, and join the support body 434 at the rear ends 362a and 362b. Increase in the respective distances between the front ends 361a, 361b and the rear ends 362a, 362b increases the respective distances between the securing points 432b, 432c in the support body 434 and the dimple contact point 311.

The peel stiffness of the gimbal tongue 431 is determined principally by the respective distances between the securing points 432a, 432b, and 432c and the dimple contact point 311. Increase in the respective distances between the securing points 432b and 432c and the dimple contact point 311 reduces the peel stiffness provided by the rear ring RR.

Consequently, the design of the suspension of the present embodiment reduces the distance between the front securing point 432a and the dimple contact point 311 to increase the peel stiffness of the gimbal tongue 431. Reduction in the distance between the securing point 432a and the dimple contact point 311 increases the peel stiffness which the front ring FR provides to the gimbal tongue 431. The distance between the securing point 432a and the dimple contact point 311 is smaller than the respective distances between the securing points 432b, 432c and the dimple contact point 311. Therefore, the peel stiffness provided by the front ring FR to the gimbal tongue 431 is higher than that by the rear ring RR.

In the example in FIG. 6, the differences between these distances are so large that the peel stiffness of the gimbal tongue 431 is substantially determined by the front ring FR. Appropriately reducing the distance between the securing point 432a and the dimple contact point 311 within a physically restricted range can increase the peel stiffness.

In the example of FIG. 6, the respective distances between the securing points 432b, 432c and the dimple point 311 are about twice as the distance between the securing point 432a and the dimple contact point 311. The respective distances between the securing points 432b, 432c and the dimple point 311 may be 1.5 times or more as the distance between the securing point 432a and the dimple contact point 311, or even 1.8 times or more. The longest distance is determined depending on the whole size of the suspension assembly and conditions in manufacture.

In the present example, the rear ring RR is secured at the two securing points 432b and 432c. In this way, securing the rear ring RR at a plurality of securing points allows the yaw stiffness provided by the rear ring RR to increase. As shown in FIG. 6, two securing points 432b and 432c may be formed at the positions sandwiching the gimbal 43 in the left-right direction. Moreover, these securing points may be symmetric on the center line passing the dimple contact point 311.

To increase the yaw stiffness that the rear ring RR provides to the gimbal tongue 431, the suspension design of the present embodiment determines the shapes of the rear arms 436a and 436b so that the ribbon-like rear arms 436a and 436b extending in the front-rear direction include straight-line parts. As to the shape of the rear arms including the straight-line parts in the present specification, the rear arm 436a will be described by way of example.

Figure 7:
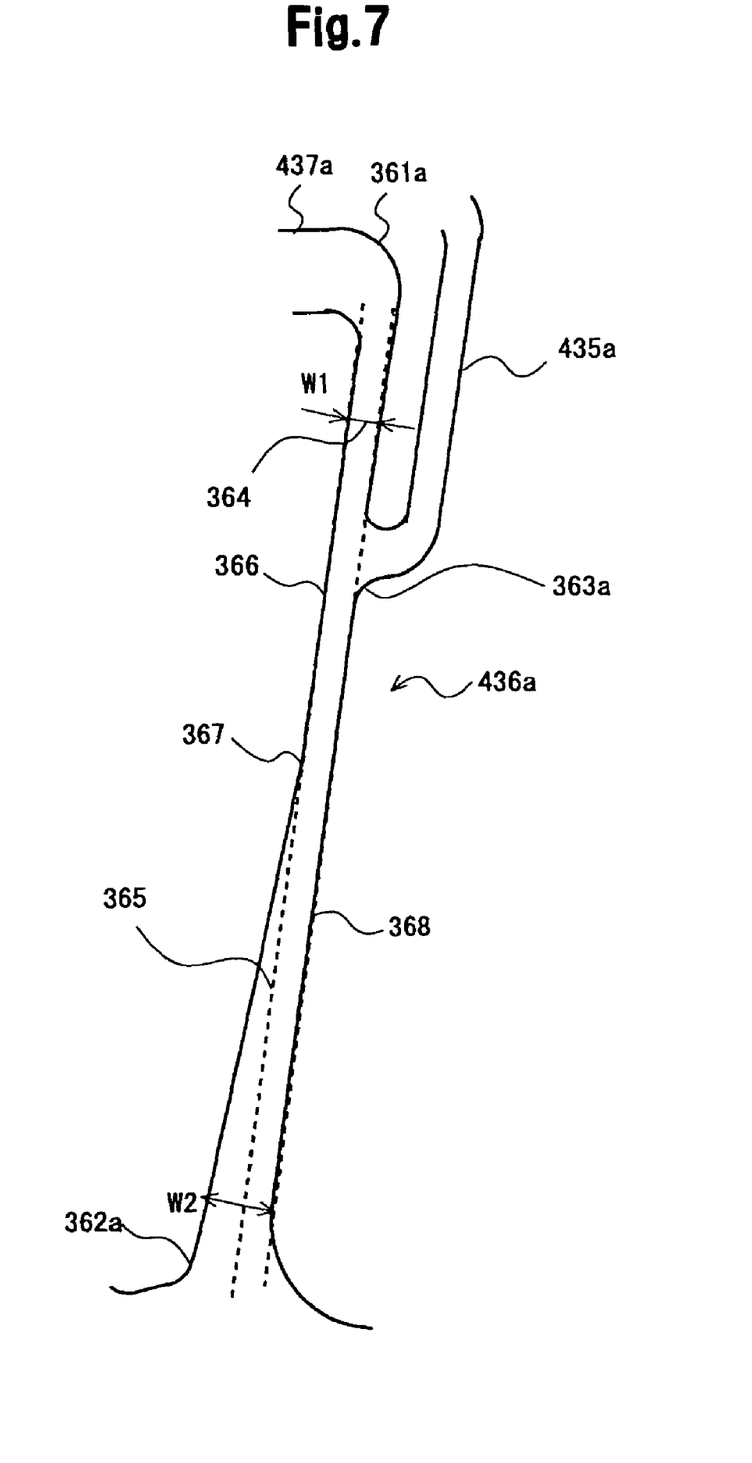
FIG. 7 is an enlarged view of a rear arm according to one embodiment.

FIG. 7 is an enlarged view of the rear arm 436a. Since the rear arm 436b is symmetric with the rear arm 436a, the description thereof will be omitted. The ribbon-like rear arm 436a extends frontward from the support body 434 to join the support arm 437a. The rear arm 436a is defined between them.

The straight-line part is determined by the part with the smallest width (smallest width part) in the rear arm 436a. If the smallest width part extends, any part within the part may be selected as the smallest width part. For example, the width W1 between the connection part 363a between the front arm 435a and the rear arm 436a and the connection part (the part at the front end 361a) between the support arm 437a and the rear arm 436a is smallest, and any position within this area may be selected as the smallest width part. In FIG. 7, the smallest width part is denoted by 364.

The straight-line part is defined by extending the smallest width part 364 in the front-rear direction within the rear arm 436a. In FIG. 7, the straight-line part is denoted by 365. The straight-line part 365 extends from the front end 361a of the rear arm 436a to the rear end 362a and the width is uniform and W1 which is the same as in the smallest width part 364. The direction where the straight-line part 365 extends is arbitrary within the front arm 435a. In the example of FIG. 7, it is the direction vertical to the width of the smallest width part 364.

In this way, in the present specification, the straight-line part in the rear arm is a part including the part with the narrowest width (the smallest width part) in the rear arm and extending straight in the front-rear direction. The width of the straight-line part is the width of the smallest width part and is uniform. The straight-line part is defined from the front end to the rear end of the rear arm in the front-rear direction. Although the direction in which the straight-line part extends is arbitrary if the straight-line part extends from the front end to the rear end of the rear arm, the direction may be vertical to the width of the smallest width part. Thus, the rear arm including the straight-line part allows the rear ring to provide the gimbal tongue with higher yaw stiffness.

As shown in FIG. 7, the width of the rear arm 436a may be the smallest between the connection part 363a with the front arm 435a and the connection part 361a with the support arm 437a because the width of this part significantly affects the roll stiffness and the pitch stiffness of the gimbal tongue 431.

On the other hand, to provide the gimbal tongue 431 with higher yaw stiffness, the width of the rear arm 436a at the connection part (the rear end 362a) of the rear arm 436a and the support body 434 may be larger. Accordingly, as shown in the example of FIG. 7, the width W2 at the proximity of the connection part with the support body 434 may be larger than the width between the connection part 363a with the front arm 435a and the connection part 361a with the support arm 437a.

In the example of FIG. 7, the inner edge (the edge on the gimbal tongue side) 366 of the rear arm 436a is bent at the middle in the direction away from the outer edge. In front of and at the rear of the bend point 367, the inner edge is straight. On the other hand, the outer edge 368 is straight from the front end 361a to the rear end 362a.

Accordingly, from the front end 361a to the bend point, the width of the rear arm 436a is uniform W1; and from the bend point to the rear end 362a, the width gradually increases. This shape effectively suppresses the effect on the stiffnesses other than the yaw stiffness provided by the rear arm 436a and contributes to increase in the yaw stiffness. In the example of FIG. 7, the inner edge 366 of the rear arm 436a bends, but instead or in addition, the outer edge 368 may bend to increase the width of the rear arm 436a toward the support body.

In this way, extending the widths of the rear arms 436a and 436b in the direction from the front to the rear can increase the yaw stiffness provided by the rear ring RR. For the manner of extending the width, gradual increase in the width from a specific position may be used as in the above example, but the width may be extended in other manners unless the width decreases in the direction from the front to the rear.

Next, the distance between the two rear arms 436a and 436b will be explained. Returning to FIG. 6, to suppress the increase in the roll stiffness provided by the rear ring RR, the distance W3 between the rear arms 436a and 436b at the rear ends 362a and 362b may be smaller. Accordingly, the distance W3 at the rear ends 362a and 362b of the rear arms 436a and 436b may be smaller than the distance (W4) at the front ends.

In this regard, the distance between the rear arms 436a and 436b is the distance between the outer edges of the rear arms 436a and 436b. Narrowing the distance between the rear arms 436a and 436b on the support body side compared with the gimbal tongue side increases the yaw stiffness while suppressing the roll stiffness provided by the rear ring RR.

For effective increase in the yaw stiffness while suppressing the roll stiffness provided by the rear ring RR, the distance between the rear arms 436a and 436b may decrease from the front toward the rear. Namely, the distance between the rear arms 436a and 436b may decrease from the distance W4 to the distance W3 without increasing from the front end to the rear end. There may be a part with a uniform distance between the rear arms 436a and 436b from the front end to the rear end.

In the example of FIG. 6, the distance between the rear arms 436a and 436b gradually decreases from the front ends 361a and 361b toward the rear ends 362a and 362b. Namely, the outer edges of the rear arms 436a and 436b are tilted inward between the front and the rear. Such a structure achieves effective increase in the yaw stiffness while suppressing the roll stiffness provided by the rear ring RR.

The positional relationship between the positions of the respective connection parts (the rear ends 362a and 362b) of the rear arms 436a, 436b and the support body 434 and the positions of the securing points 432b and 432c is important. As described above, to increase the yaw stiffness provided by the rear ring RR, two securing points 432b and 432c may be provided. On the other hand, to reduce the effect on the roll stiffness from the rear arms 436a and 436b, the rear ends 362a and 362b may be located inner than the securing points 432b and 432c in the left-right direction (the direction where the rear arms 436a and 436b are aligned). Accordingly, the distance W3 between the rear arms 436a and 436b at the rear ends 362a and 362b is smaller than the distance between the two securing points 432b and 432c (the distance in the left-right direction).

Next, the support arms 437a and 437b will be explained. In FIG. 6, the support arms 437a and 437b are connected to the side edges 315a and 315b of the gimbal tongue 431, respectively. Accordingly, the rear arms 436a and 436b are connected to the side edges 315a and 315b of the gimbal tongue 431 by the support arms 437a and 437b, respectively. In this way, connecting the rear ring RR to the side edges 315a and 315b of the gimbal tongue 431 achieves higher yaw stiffness provided by the rear ring RR compared with connecting the rear ring RR to the trailing edge 313 or the leading edge 314.

Depending on the design, however, the rear ring RR may be connected to the trailing edge 313 or the leading edge 314. In this case, the arms extending leftward and rightward from the gimbal tongue 431 are the support arms and the arms connected to the support arms and extending rearward from the support arms are the rear arms.

The positions where the rear ring RR is connected to the side edges 315a and 315b of the gimbal tongue 431, namely the positions of the support arms 437a and 437b on the side edges 315a and 315b, affect the pitch stiffness provided by the rear ring RR. The support arms 437a and 437b provided closer to the front end can achieve lower pitch stiffness provided by the rear ring RR while increasing the yaw stiffness.

Figure 8:
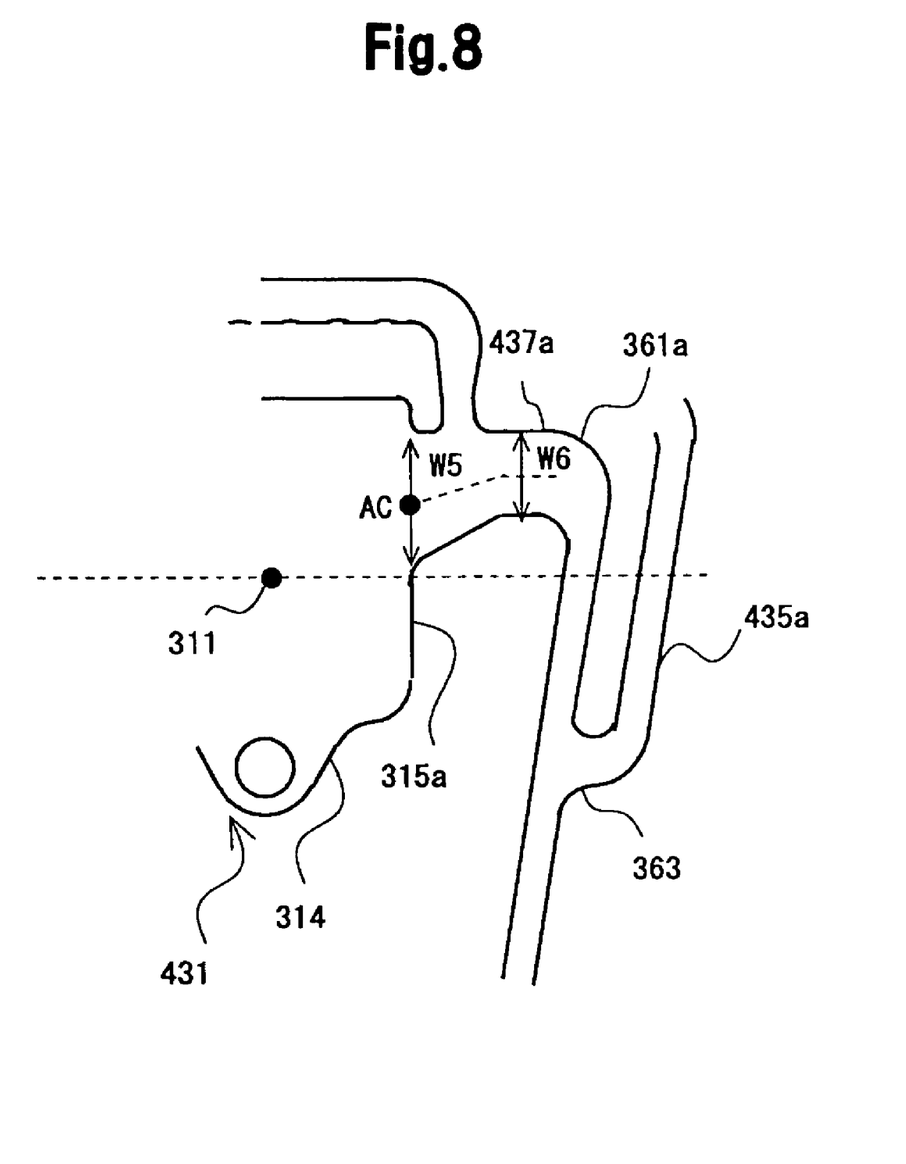
FIG. 8 is an enlarged view of a support arm according to one embodiment.

Accordingly, on the side edges 315a and 315b, the center positions of the support arms 437a and 437b in the front-rear direction may be located in front of the dimple contact point 311. FIG. 8 shows the center AC on the side edge 315a of the support arm 437a is in the area in front of the dimple contact point 311.

The width (the size in the front-rear direction) of the support arms 437a and 437b affects the magnitude of the yaw stiffness provided by the rear ring RR. To increase the yaw stiffness, the support arms 437a and 437b may have a larger width. On the other hand, the larger width of the support arms 437 and 437b may likely cause increase in the pitch stiffness provided by the rear ring RR.

The support arms 437a and 437b join the gimbal tongue 431 on the side edges 315a and 315b and join the rear arms 436 and 436b on the opposite ends. The width of the support arms 437a and 437b on the side edges 315a and 315b is particularly important for the yaw stiffness. FIG. 8 shows the width W5 at the side edge 315a of the support arm 437a. To increase the yaw stiffness, this width may be larger than the smallest width of the rear arms 436a and 436b (W1 in FIG. 7), and may be larger than the largest width (W2 in FIG. 7) of the rear arms 436a and 436b.

To reduce the effect on the pitch stiffness from the support arms 437a and 437b, the support arms 437a and 437b may have a smaller width in the parts farther from the side edges 315a and 315b (the parts closer to the rear arms 436a and 436b than at the side edges 315a and 315b) of the gimbal tongue 431 than at the side edges 315a and 315b.

As shown in FIG. 8, the support arm 437a has a smaller width W6 in the part away from the side edge 315a. The support arm 437b is the same. More specifically, in the example shown in FIGS. 6 and 8, the width of the support arms 437a and 437b gradually decreases from W5 to W6 as getting away from the side edges 315a and 315b of the gimbal tongue 431.

As shown in FIGS. 6 and 8, in the support arms 437a and 437b of the present example, the widths decrease as if the rear ends were chipped off. Namely, the rear edges of the support arms 437a and 437b are inclined frontward from the side edges 315a and 315b and the center lines of the support arms 437a and 437b in the front-rear direction (denoted by the dotted line in FIG. 8) are shifted frontward at positions away from the side edges 315a and 315b of the gimbal tongue 431.

Thereby, the same effect as the support arms 437a and 437b shifted frontward can be obtained so that the pitch stiffness provided by the rear ring RR can be reduced.

Next, front arms 435a and 435b will be explained. The front arms 435a and 435b extend leftward and rightward from the proximity of the securing point 432a in the front, bend rearward, extend rearward on the outer side than the rear arms 436a and 436b, and join the rear arms 436a and 436b, respectively. In the present example, the widths of the front arms 435a and 435b are uniform.

The front arms 435a, 435b, the support arms 437a, 437b, and the parts between the connection parts 363a, 363b and the connection parts 361a, 361b in the rear arms 436a, 436b form a front ring FR. The front ring FR supports a gimbal tongue 431 on the side edges 315a and 315b of the gimbal tongue. The front ring FR is connected to the securing point 432a with a connecting part 351 at the center of the front tip. The connecting part 351 has a function to reduce the pitch and roll stiffnesses provided by the front ring FR. Depending on the design, the securing point 432a may be formed on the front ring FR without the connecting part 351.

The front arms 435a and 435b of the present embodiment may join the rear arms 436a and 436b at the middle of the rear arms. Namely, the connection parts 363a and 363b between the rear arms 436a, 436b and the front arms 435a and 435b are located between the front ends 361a, 361b and the rear ends 362a, 362b. Such a structure reduces the stiffness in the front arms 435a and 435b so that the pitch and roll stiffnesses provided by the front ring FR to the gimbal tongue 431 can be reduced.

To securely reduce the pitch and roll stiffnesses provided by the front ring FR the connection parts 363a and 363b of the rear arms 436a, 436b and the front arms 435a, 435b may be located at the rear of the dimple contact point 311 (refer to FIGS. 6 and 8).

The stiffness of the gimbal having the structure shown in FIG. 6 in the present embodiment and the stiffness of the gimbal having the structure explained with reference to FIG. 10 as a conventional art were analyzed. Hereinafter, the results will be described. Assuming that the values of the stiffnesses of the gimbal having the structure of FIG. 10 were 1, the values of the stiffnesses of the gimbal having the structure shown in FIG. 6 were as follows: the pitch stiffness was 1.09, the roll stiffness was 1.03, the peel stiffness was 0.97, and the yaw stiffness was 6.8.

The pitch stiffness ($\mu$Nm/deg) indicates the moment ($\mu$Nm) when the gimbal tongue is tilted on the dimple contact point in the pitching direction by a unit angle, and the roll stiffness ($\mu$Nm/deg) indicates the moment ($\mu$Nm) when the gimbal tongue is tilted on the dimple contact point in the rolling direction by a unit angle.

The peel stiffness (N/m) is a force required to displace the gimbal tongue at the dimple contact point toward the magnetic disk by a unit length, and the yaw stiffness ($\mu$Nm/deg) is the moment ($\mu$Nm) when the gimbal tongue is tilted on the dimple contact point in the yawing direction by a unit angle. These stiffnesses can be measured through a known method of a person skilled in the art.

As understood from the above analysis, the gimbal structure of the present embodiment achieves far higher yaw stiffness in addition to approximately the same pitch stiffness, roll stiffness, and the peel stiffness. The higher yaw stiffness allowed the yaw mode oscillation frequency of the gimbal tongue to shift to a higher value, which can achieve more precise head positioning.

As set forth above, the present invention has been described by way of particular embodiments but is not limited to the above embodiments. A person skilled in the art can easily modify, add, and convert each element in the above embodiments within the scope of the present invention. For example, embodiments of the present invention may be applied to a disk drive employing disks other than magnetic disks as media. Typically, the gimbal is secured to the load beam by welding but other methods may be adopted.

Embodiments of the present invention can be applied to a left-right symmetric shaped suspension. Embodiments of the present invention are particularly useful to a ramp loading and unloading disk drive but may be applied to a contact start and stop disk drive. Embodiments of the present invention may be applied to an HGA where the trailing edge of a head slider faces the rearward of the suspension. In such a disk drive, the disk's spin direction is the reverse from the above description.

What is claimed is:

1. A suspension comprising:
    a load beam; and
    a gimbal secured to the load beam for supporting a head slider, comprising:
        a first support area including a first securing point where the gimbal is secured to a front of the load beam;
        a second support area including a second securing point where the gimbal is secured to a rear of the load beam;
        a gimbal tongue having a mount surface on which the head slider is mounted for performing pivoting motion on a dimple contact point;
        a front ring comprising a ring-shaped spring structure joining the first support area for supporting the gimbal tongue and providing the gimbal tongue with peel stiffness; and
        a rear ring comprising a second ring-shaped spring structure joining the second support area for supporting the gimbal tongue and providing the gimbal tongue with higher yaw stiffness than the front ring and lower peel stiffness than the front ring.

2. The suspension according to claim 1, wherein a distance between the first securing point and the dimple contact point is smaller than the distance between the second securing point and the dimple contact point.

3. The suspension according to claim 1, wherein:
    the rear ring comprises a pair of ribbon-like rear arms extending frontward from the second support area; and
    each of the pair of rear arms includes the smallest width part in the rear arm and a straight-line part including a smallest width part in the rear arm and extending from the front end to the rear end of the rear arm while maintaining the smallest width.

4. The suspension according to claim 3, wherein a width of each of the pair of rear arms increases in the direction from the front end toward the rear end.

5. The suspension according to claim 3, wherein a distance between the pair of rear arms decreases in the direction from the front end toward the rear end.

6. The suspension according to claim 1, wherein the second support area includes two securing points which are located closest to the dimple contact point in the rear.

7. The suspension according to claim 6, wherein the connection part between each of the pair of rear arms and the second support area is located between the two securing points in the arrangement direction of the pair of rear arms.

8. The suspension according to claim 3, wherein the rear ring further comprises a pair of support arms each connecting a side edge of the gimbal tongue and each of the front ends of the pair of rear arms.

9. The suspension according to claim 8, wherein a center of the support arm at each of the side edges of the gimbal tongue is located in front of the dimple contact point.

10. The suspension according to claim 1, wherein
    the front ring includes a pair of front arms and a pair of support arms;
    the rear ring comprises a pair of ribbon-like rear arms extending frontward from the second support area;
    each of the pair of support arms connects the gimbal tongue and each of the pair of rear arms; and
    each of the pair of front arms is connected to each of the pair of rear arms at the rear of the connection part to the pair of support arms.

11. The suspension according to claim 10, wherein the width of each of the pair of rear arms gradually increases from a specific position at the rear of the connection part to the front arm toward the second supporting area.

12. A disk drive comprising:
    a disk;
    a head slider for accessing the disk; and
    an actuator having a suspension for supporting the head slider for moving the head slider above the disk by swinging on a swing shaft; wherein the suspension comprises,
    a load beam, and
    a gimbal secured to the load beam for supporting a head slider, comprising:
        a first support area including a first securing point where the gimbal is secured to a front of the load beam;
        a second support area including a second securing point where the gimbal is secured to a rear of the load beam;
        a gimbal tongue having a mount surface on which the head slider is mounted for performing pivoting motion on a dimple contact point;
        a front ring comprising a ring-shaped spring structure joining the first support area for supporting the gimbal tongue and providing the gimbal tongue with peel stiffness; and
        a rear ring comprising a second ring-shaped spring structure joining the second support area for supporting the gimbal tongue and providing the gimbal tongue with higher yaw stiffness than the front ring and lower peel stiffness than the front ring.

13. The disk drive according to claim 12, wherein a distance between the first securing point and the dimple contact point is smaller than the distance between the second securing point and the dimple contact point.

14. The disk drive according to claim 12, wherein:
    the rear ring comprises a pair of ribbon-like rear arms extending frontward from the second support area; and
    each of the pair of rear arms includes the smallest width part in the rear arm and a straight-line part including a smallest width part in the rear arm and extending from the front end to the rear end of the rear arm while maintaining the smallest width.

15. The disk drive according to claim 14, wherein a width of each of the pair of rear arms increases in the direction from the front end toward the rear end.

16. The disk drive according to claim 14, wherein a distance between the pair of rear arms decreases in the direction from the front end toward the rear end.

17. The disk drive according to claim 12, wherein the second support area includes two securing points which are located closest to the dimple contact point in the rear.

18. The disk drive according to claim 17, wherein the connection part between each of the pair of rear arms and the second support area is located between the two securing points in the arrangement direction of the pair of rear arms.

19. The disk drive according to claim 14, wherein the rear ring further comprises a pair of support arms each connecting a side edge of the gimbal tongue and each of the front ends of the pair of rear arms.

20. The disk drive according to claim 19, wherein a center of the support arm at each of the side edges of the gimbal tongue is located in front of the dimple contact point.

* * * * *